Nov. 24, 1953 — G. A. MONTGOMERY — 2,660,199
REINFORCED CONCRETE CONDUIT
Filed May 1, 1947 — 3 Sheets-Sheet 1
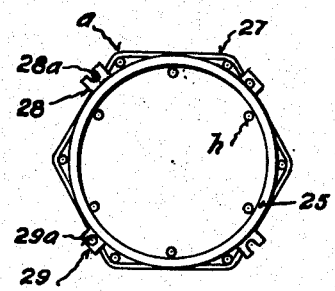
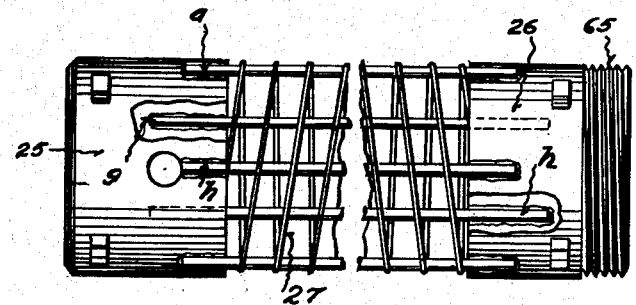
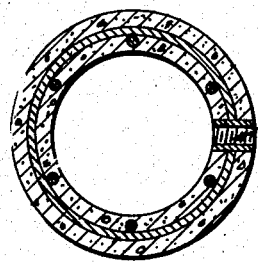
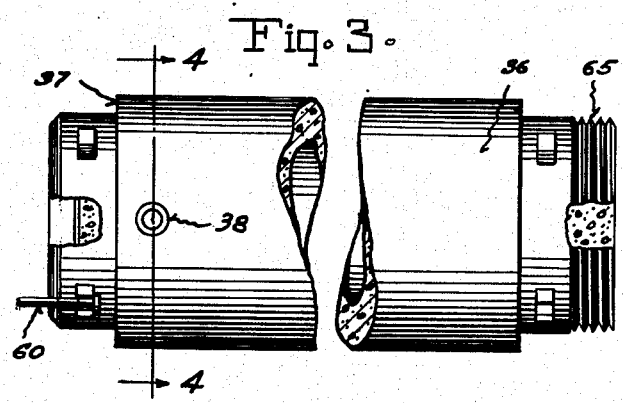
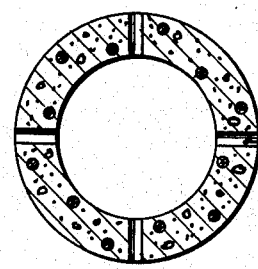
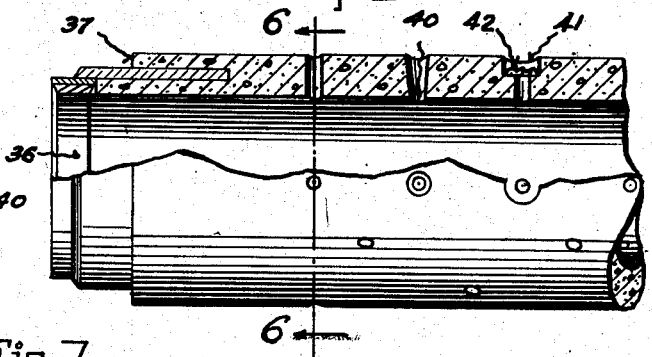
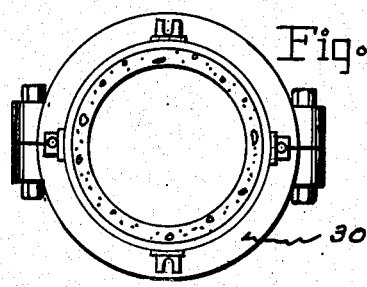
INVENTOR.
Gustaf A. Montgomery
BY
ATTORNEYS Nov. 24, 1953     G. A. MONTGOMERY     2,660,199
REINFORCED CONCRETE CONDUIT Filed May 1, 1947     3 Sheets-Sheet 2

INVENTOR.
Gustaf A. Montgomery
BY
ATTORNEYS

INVENTOR.
Gustaf A. Montgomery

ATTORNEYS

Patented Nov. 24, 1953

2,660,199

UNITED STATES PATENT OFFICE 2,660,199

REINFORCED CONCRETE CONDUIT

Gustaf A. Montgomery, Buenos Aires, Argentina

Application May 1, 1947, Serial No. 745,198

4 Claims. (Cl. 138—84)

My present invention has for its object to provide certain improvements in the construction of reinforced concrete conduits whereby they are especially adapted to withstand either internal or external pressures, rendering them serviceable for various commercial purposes whether used horizontally and parallel to the ground surface, or suspended vertically and used as a casing in wells.

Another object of my invention is to provide as an article of manufacture a reinforcing structure to be assembled in pipe lengths and comprising end coupling members, connecting tension elements, and spiral stabilizers all united as a unit and adapted to be subsequently embedded in a sheath which constitutes the tube or pipe.

Furthermore my invention comprehends the production of lengths of concrete pipe reinforced throughout and provided with couplings embedded between the inner and outer walls having exposed ends for uniting succeeding lengths and capable of being protected both interiorly and exteriorly by cement coatings which virtually become smooth continuations of the interior and exterior surfaces of the built up conduit.

A still further object of my invention is to provide lengths of concrete pipe provided with embedded cylindrical end collars connected by embedded rectilineal members geometrically arranged in axial parallelism for resisting tensional strains, portions of the collar extending beyond the concrete sheath serving as connecting elements between successive lengths of pipe and provided with fittings especially adapted to aid in handling individual pipes while undergoing the process of manufacture but also capable of serving as a means for temporarily securing the separate lengths during the assembling of a conduit.

Another feature of my invention relates to the provision of means whereby the metallic collars at the ends of different points of a concrete conduit may be welded without damage to the concrete per se comprising a "buring ring" inserted within and overlapping the contiguous ends of two collars which are covered with cement to form a continuation of the smooth interior of the pipe.

With particular reference to well casings one of the objects of my invention is to provide a form of reinforcement which will enable long lengths of concrete pipe to be suspended in a bore hole and to be rotated both clockwise and counterclockwise to overcome frictional engagement in its descent in the hole and subsequently positioning the shoe at its lower end, these desirable attributes being accomplished by the method of tensioning the longitudinal reinforcing members in the first instance and subsequently connecting to them spiral reinforcements wound in both right and left hand directions.

To these and other ends my invention has for its object to provide further improvements in construction, all as will be fully described in the accompanying specification, the novel features thereof being set forth in the appended claims.

In the drawings:

Figure 1 is a side elevational view of one form of reinforcement employed in carrying out my invention, showing at the right hand end a threaded collar for effecting a secure joint connection between successive pipe sections and at the left a collar intended for a welded joint.

Figure 2 is an end view thereof.

Figure 3 is a side elevation showing the reinforcing skeleton of Fig. 1 embedded in a concrete sheath.

Figure 4 is a cross sectional view taken on the line 4—4 of Fig. 3.

Figure 5 is a view, similar to Fig. 3, the upper half being shown in section and illustrating the manner in which a section of the pipe may be perforated for special purposes.

Figure 6 is a cross sectional view taken on the line 6—6 of Fig. 5.

Figure 7 is a plan view of a two-part clamp suitable for handling the reinforcement during the building up of the concrete sheath and subsequently handling the completed pipe sections.

Similar reference characters in the several figures indicate similar parts.

Figure 11:
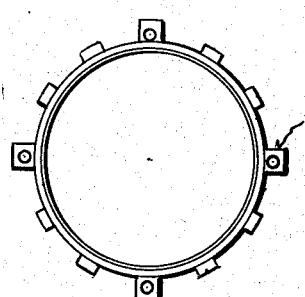
Figures 11, 12 and 13 are end views of the framework shown in Figs. 8, 9 and 10, respectively.
Figure 12:
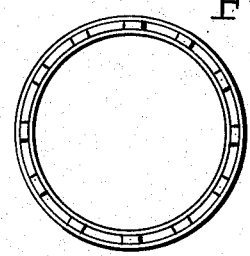
Figure 13:
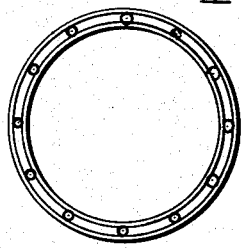
Figure 15:
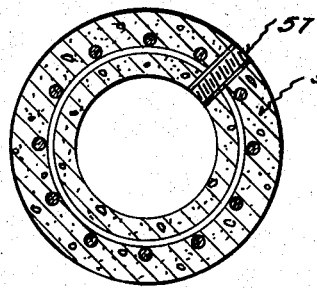
Figure 15 is a transverse sectional view taken on the line 15—15 of Fig. 14.

In carrying out my invention in the construction of pipe sections of given diameter and length I employ an integral metallic skeleton structure composed of a plurality of parallel bars axially disposed with reference to the center line or axis of the pipe which serve as connecting elements for a pair of cylindrical end sleeves. The latter are of greater diameter than the intended diameter of the finished pipe and the manner of applying the sheath to the skeleton is such that the sleeves are covered both inside and out with a layer of cement, save for so much of their extremities as may be required for the application of the devices employed for connecting succeeding pipe lengths. As to these coupling portions my invention provides for also covering them interiorly and exteriorly so that in a completed conduit, or oil well string of pipe, no metal parts are exposed thus rendering them free from corrosive action; possible heat loss and obviating the necessity of using insulation in certain installations.

In Fig. 1 I show one form of the reinforcing skeleton for a unit pipe length. It comprises the end sleeves or nipples 25 and 26 spaced apart the required distance and connected by two sets of tension bars, one set, indicated by a, b, etc. being united to the outer peripheries of the sleeves, the other set, indicated by g, h, etc. being disposed alternately to those first mentioned and united to the inner circumferences of the sleeves. With reference to said bars it will be understood that their numbers and combined tensile strength is calculated to meet the requirements of use to which the tubes will be subjected and will vary depending generally upon whether the tubes are to be laid horizontally or suspended in a well.

For resisting external pressures, having a tendency to collapse a pipe, and also internal pressures, which might cause it to burst, I provide as a component part of the aforementioned skeleton spiral or helicoid wrappings which are preferably laid as chords extending between the longitudinal bars. One of these wrappings 27 extends spirally around the outer set of bars a—b, etc. and the other is also spirally laid so that it alternately passes over the outer bars a, b and beneath the intermediate disposed bars g, h, etc. Said coils are, as will be understood, permanently united to each of the longitudinal bars.

On the collars and nipples 25, 26 I provide sets of bosses or lugs, two of which are shown and indicated by 28 and 29, those of each set being diametrically disposed, and one set being provided with recesses 28ª, while the other set is perforated, as indicated by 29ª. Said bosses perform two functions, first as supporting elements for the reinforcing skeleton while the pipe lengths are being molded and secondly as elements for aiding the assembly and alining of successive lengths of pipe into a continuous conduit. They may also serve as connections for cables attached to dead men for anchoring a conduit which may be laid on a sloping surface. The sets of bosses on the nipples 25—26 are accurately alined and for cooperation therewith I employ a split clamp 30, such as shown in Fig. 7, the outer face of which is provided with recesses forming seats for the bosses 28 and 29.

An important feature to be observed in manufacturing the reinforcing skeleton, especially when it is to be employed in making well casings is to equalize the tension in the several longitudinal bars a, b and g, h. This I accomplish by suspending the skeleton at one end in the clamp 30, heating the several bars uniformly and subjecting them to axial pull either by hydraulic pressure or otherwise applied to the bosses at the other end of the skeleton.

While I have not illustrated herein the apparatus for molding the pipe covering or sheath brief reference to the method followed will aid in understanding the construction of a completed pipe section. In casting the sheath the skeleton (Fig. 1) is firmly anchored at its lower end in a clamp (Fig. 7) and its upper end held by a similar clamp operated by a suitable means for imparting an axial strain on the skeleton for the purpose of arresting vibration of the longitudinal bars. A stuffing box is fitted within the lower nipple in which is journaled a mandrel of the desired diameter. The latter determines the inside diameter 35 of the completed pipe and is such that this part of the sheath extends quite close to the outer free edge of the nipples, as indicated at 36 in Figs. 5 and 16 for welded joints, or actually to the free end of the nipples in the case of threaded joints, as indicated in Fig. 17. Exteriorly of the lower nipple and above the bosses 28—29 thereon there is fitted the lower end of the rotating cylindrical casting or mold form which in turn is of the diameter determining the outer periphery of the pipe section, its lower end forming the outer end shoulder 37. At the upper end of the finished pipe the same shoulders 36 and 37 are formed, the distance of the shoulders 37 from the free ends of the nipples 25—26 is regulated in accordance with the type of coupling or joint to be accommodated, for example a welded joint as shown at the left hand end of Fig. 1, or a threaded joint illustrated at the right hand end of said figure. Both the inner and outer shoulders 36 and 37 are also preferably undercut for a purpose to be presently described.

In instances where it is desired to provide for branch connections, such as at the upper end of the uppermost section of a well casing, for the accommodation of a Christmas tree in association with a well head, there may be fitted into an aperture in the nipple 25 short sections of metal pipe 38, threaded internally and of a length equal to the predetermined thickness of the concrete sheath (see Figs. 3 and 4).

My invention also lends itself to the production of perforated tubes or filters in lieu of metallic filters which are often destroyed by the corrosive action of certain fluids. In Fig. 5 I have illustrated the manner in which numerous perforations 40 may be provided by locating them in the interstices between the several elements of the reinforcing skeleton. If desired the perforations may be countersunk at their outer ends, as indicated by 41 and covered by a non-corrosive screen 42.

Figure 8:
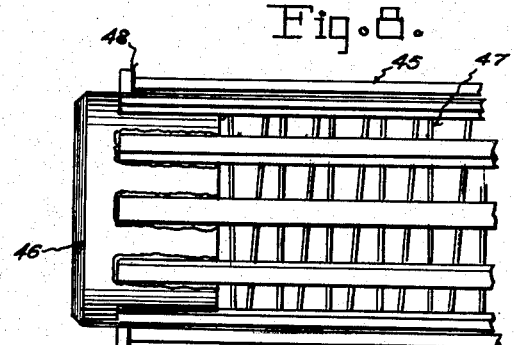
Figures 8, 9 and 10 are detail views illustrating different ways in which the framework of the reinforcing elements may be assembled.

In Fig. 8 I have shown modifications of the construction of the reinforcing skeleton in which the longitudinal tension bars 45 are rectangular in cross section and all united to the end nipples, of which one is shown and indicated by 46, and the lateral helicoidal pressure resister member 47 is disposed within and united at its contact points to the inner surfaces of the bars and for a few turns to the inside of the nipples. In this construction the lugs or bosses 48, corresponding to the bosses 28—29 of Figs. 1 and 2, are formed by turning outwardly short lips on the ends of several of the bars 45.

Figure 9:
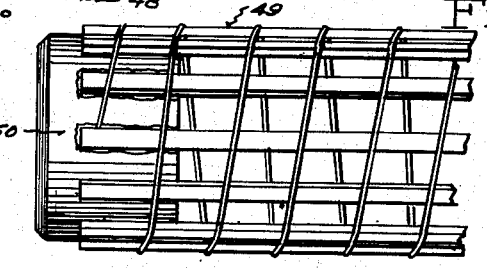

Figure 9 is similar to Fig. 8, the longitudinal bars 49 being joined to the end nipple 50, except that in this structure the single spiral member is wrapped around the outer sides or faces of the bars.

Figure 10:
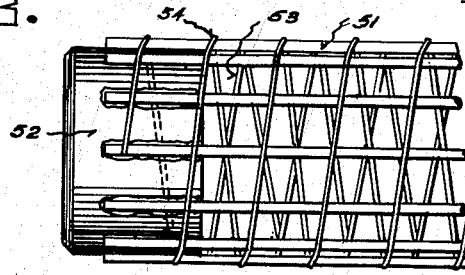

Another modification depicted in Fig. 10 shows the longitudinal bars 51 as rods of circular cross section all attached to the periphery of the nipple 52 and inner and outer wire spirals 53 and 54 which are each united at their points of engagement with the opposite sides of the bars 51.

Figure 14:
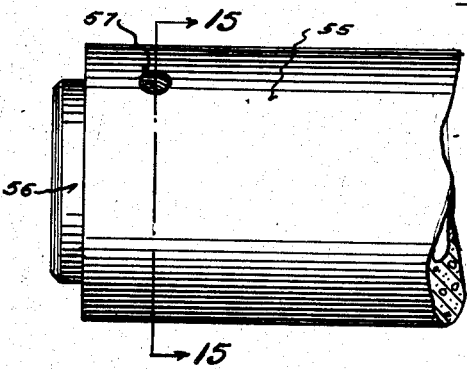
Figure 14 is an elevational view showing the concrete sheath molded around the framework depicted in Fig. 10.

One end of a completed length of pipe embodying the skeleton of Fig. 10 is shown in Fig. 14, the sheath or pipe proper being indicated by 55. In this view is also shown the manner for effecting branch connections by securing to an end nipple, such as 56, a short length of metal pipe 57, of suitable length which is threaded interiorly at its outer end.

An important feature of my invention resides in the manner in which the joints between two adjacent pipe lengths is accomplished whereby no metal parts are exposed either interiorly or exteriorly and also whereby either welded or threaded joints may be employed, depending upon the particular installation in which the conduit is to be used.

Figure 16:
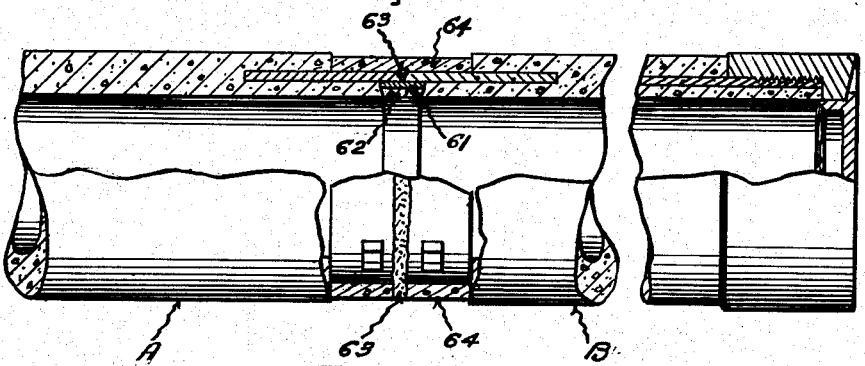
Figure 16 is a side view of two connected pipe sections illustrating the manner of uniting them by means of a welded joint, the upper half of the figure being in section to show the interior of the joint and the remainder being in elevation.
Figure 17:
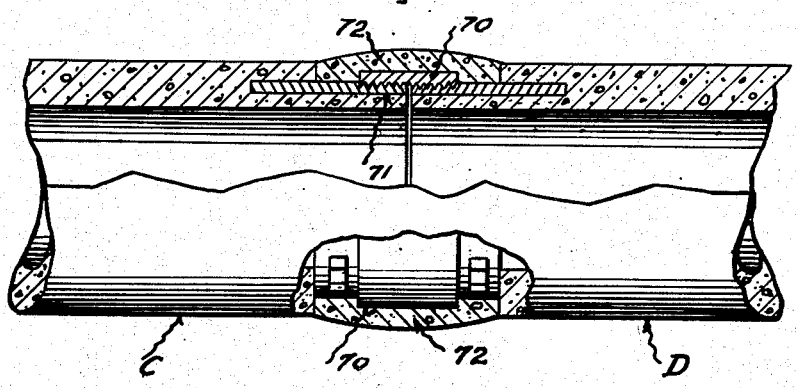
Figure 17 is a view similar to Fig. 16, a screw joint connection being illustrated.

Referring to Fig. 16 this illustrates a welded joint as it appears when completed, the upper half of the figure above the center line being in section showing the interior of two contiguous pipe sections A and B and the interior of the joint, while the lower half being in elevation shows the exterior of the joint before it is sealed. Successive pipe sections are first alined and then drawn together by means of bolts 60 (Fig. 3) connecting complementary sets of bosses 28 or 29 on opposing pipe nipples, said bolts being removed when welding tack points have been made. Preliminary to drawing the pipe sections together there is inserted in one of the nipples a "buring-in-ring" 61. This element fits closely within the nipples and is of a width to span the space between the shoulders 36 of the inner concrete lining of the adjacent pipe sections, this distance being such at each side of the meeting point of the two nipples that the inner concrete lining will not be affected by the heat developed during the welding operation. The ring contains an inner lining 62 having chamfered edges fitting the corresponding undercut edges 36 and before it is fitted in place a slur of "neat" cement is applied to said edges to bond them together, any excess thereof being squeezed out when the pipe sections are drawn together. By using the ring 61 it becomes possible to obtain a penetration of the weld, indicated as 63, between the adjacent ends of two nipples, assuring a complete bond lying entirely within the outer circular circumference of both pipe sections. This permits the space between the end shoulders 37 of the two pipe sections and the outer exposed ends of the nipples to be subsequently covered and protected by a space filler 64. The latter is purposely formed slightly less in diameter than the periphery of the pipes to serve as a marker for the joint location.

For use in those instances where it is desired to employ screw joint connections I have shown in Fig. 17 such an arrangement, the end nipples being threaded as illustrated at the right hand end of each of the Figures 1 and 3 where the threads are indicated by 65. The latter may be cut either as right or left hand threads or a combination of the two employed upon the successive pipe lengths such as C and D of Fig. 17, the screw collars such as 70, being threaded accordingly. When a screw joint connection is to be used the inner portion of the concrete sheath is extended the full length of the nipple as indicated at 71. Hence when two pipe sections are to be joined an inner seal is formed by a slurry of "neat" cement applied to the end of a section, the excess thereof being squeezed out when the coupling is drawn together. Said excess may be readily removed by a long handled brush or wiper.

In completing the screw type joint the exposed portions of the adjacent nipples and the connecting collar 70 are protected with a filler 72 the circumference of which may be depressed slightly, in the event the connected string of piping is to be used in a well, or arched, as shown in Fig. 17 which is a suitable form of joint identification for conduits that are laid horizontally.

In practice the fillers 64 and 72 are given appropriate colors to indicate the character of the fluid transmitted through the conduit, different colors being used for acid, oil, water, etc.

Figure 18:
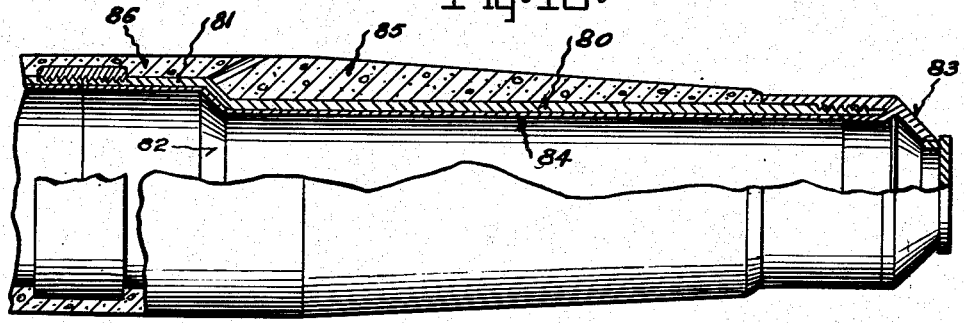
Figure 18 illustrates the adaptation of the invention in the construction of a fluid shut-off shoe for use in well drilling operations.
Figure 19:
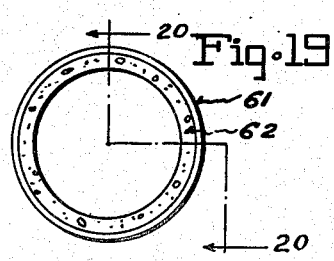
Figure 19 is a detail plan view of the buring ring employed in making welded joints as shown in Fig. 16.
Figure 20:
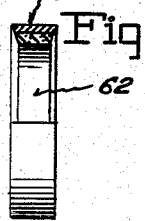
Figure 20 is a cross section thereof taken on the line 20—20 of Fig. 19.

A reinforcement skeleton such as previously described may also be employed in the construction of shoes for use in well drilling operations for shutting off the flow of oil or water, as an adjunct to a well casing composed of connected lengths of the concrete pipe constructed in accordance with my invention. In constructing such a shoe it will be made shorter than a standard pipe length and tapered on its exterior surface as shown in Fig. 18. This figure also serves to illustrate a modified construction for a shutoff shoe which may be employed where pressures encountered in a well are great and shut-off occurs at a point beyond which the drilling is to be continued to a greater depth. Hence the shoe is shown as a smaller tubular metal extension 80 on a collar or nipple 81 to which it is secured by an inclined reducing flange 82, the latter being indicative of intended deeper drilling as well as the conical guide tip 83 which latter is customarily broken loose by the drill bit. The inner surface of the collar, the reducing flange and the metal extension are provided interiorly with a coating 84 of cement and likewise with a tapered reinforced exterior coating 85 and a joint covering 86. Where the tapered outer coating is used with the reducing flange an exterior bell flange 86 is provided to form a shoulder for engagement with the reinforced castings.

A shut-off shoe such as above described may have its lower extremity 83 either opened or closed. However, I have found in well operations where it is desired to cement the string of casing in the drilled hole that due to the weight of a pipe when formed of cement in accordance with the invention herein set forth, which exceeds by at least three times that of a string composed entirely of metal, a different method of performing the cementing job may be employed. Heretofore metal pipe has been cemented in place by forcing a slurry of cement through the pipe under pressure to cause it to flow upwardly from the bottom of the pipe into the well hole which often results in causing channeling or other imperfect completions. Since the weight of my reinforced concrete well casing is sufficient to cause it to sink to the shoe seat I have found in practice that a well hole when drilled to the desired depth may be partly filled with a suitable cement slurry into which the casing, closed at its lower end, may be lowered to position the shut-off shoe at the desired point. The resulting displacement of the slurry will cause it to rise in the hole to surround the casing for a calculated predetermined distance. It will be seen that I am able in this way to achieve a distinct advantage in that the interior of the casing being wholly free there is no cement therein which subsequently sets and must be drilled out before further well drilling can proceed.

It will be appreciated from the foregoing detailed description that my invention comprehends the construction of pipe sections each embodying an embedded metallic reinforcement capable of withstanding forces exerting either tension or compression which being continuously connected when several sections are joined together form a conduit of great strength throughout its entire length. The helices also forming part of the reinforcing skeleton not only protect the pipe structure against forces of expansion and compression but also against torsional forces. The fact that all metallic components of the pipe sheaths and the inner and outer joint coverings are completely sealed off provides a means for creating strings of well casing, or conduits for other commercial purposes, which will not fail in use from deterioration of said metallic parts due to corrosive action.

I claim:

1. A metal reinforcing skeleton for concrete pipe sections comprising spaced end collars, handling lugs on the outer periphery of the collars adjacent their outer edges, bars extending between the collars and secured to their peripheries adjacent their inner edges, and a spiral wire extending between the collars in contact with and connected to said bars, and a clamp composed of separable members enclosing said handling lugs, said clamp having recesses receiving said handling lugs.

2. A metal reinforcing skeleton for concrete pipe sections comprising spaced end collars, spaced sets of parallel bars alternately disposed on the inner and outer peripheries of said collars and connected at their ends to said collars, a spiral wire extending from one collar to the other and woven over and under the alternate bars of said sets.

3. A reinforced concrete pipe section comprising spaced end collars having coupling attachments on their exteriors adjacent their outer edges, parallel bars spaced about the collars and united thereto in rear of said attachments, a spiral wire in engagement with said bars and attached thereto and extending from one collar to the other, an enclosing tubular jacket of molded material having an interior and exterior diameter less than the corresponding diameters of the collars, said jacket on its inner face embracing most of the collars and its exterior face terminating close to the coupling attachments.

4. A reinforced concrete pipe section comprising spaced collars, connecting bars attached at their ends to the inner proximate half portions of the collars, lugs on the peripheries of the collars located between the ends of said bars and the outer edges of the collars for the dual purpose of suspending the framework thus formed and serving as means for attachment of draw bolts for uniting similar pipe sections in end to end relation, said section also comprising a tubular concrete jacket enclosing both sides of the framework, said jacket terminating on its inner surface short of the outer edges of the collars and on its outer side short of said lugs.

GUSTAF ALFRED MONTGOMERY.

References Cited in the file of this patent

UNITED STATES PATENTS

| Number | Name | Date |
| --- | --- | --- |
| 599,558 | Greenfield | Feb. 22, 1898 |
| 1,441,908 | Bille | Jan. 9, 1923 |
| 1,830,202 | Jenkins | Nov. 3, 1931 |
| 1,934,701 | Edwards et al. | Nov. 14, 1933 |
| 2,092,042 | Armentrout et al. | Sept. 7, 1937 |
| 2,153,741 | Cobi | Apr. 11, 1939 |
| 2,160,228 | Pustmueller | May 30, 1939 |
| 2,191,025 | Mitchell | Feb. 20, 1940 |
| 2,224,419 | Whitman | Dec. 10, 1940 |
| 2,234,643 | Grant | Mar. 11, 1941 |
| 2,250,871 | Lumbert | July 29, 1941 |
| 2,325,469 | Boissou | July 27, 1943 |
| 2,405,567 | Ferla | Aug. 13, 1946 |

FOREIGN PATENTS

| Number | Country | Date |
| --- | --- | --- |
| 26,483 | Norway | Dec. 6, 1915 |
| 299,761 | Italy | Aug. 16, 1932 |